US008860702B2

(12) United States Patent

Choi et al.

(10) Patent No.: US 8,860,702 B2
(45) Date of Patent: Oct. 14, 2014

(54) DISPLAY DEVICE AND DRIVING METHOD THEREOF

(75) Inventors: Yong-Jun Choi, Asan-si (KR); Jae-Suk Choi, Uijeongbu-si (KR); Jung Hwan Cho, Asan-si (KR)

(73) Assignee: Samsung Display Co., Ltd. (KR)

( * ) Notice: Subject to any disclaimer, the term of this patent is extended or adjusted under 35 U.S.C. 154(b) by 458 days.

(21) Appl. No.: 13/352,197

(22) Filed: Jan. 17, 2012

(65) Prior Publication Data

US 2013/0057565 A1 Mar. 7, 2013

(30) Foreign Application Priority Data

Sep. 7, 2011 (KR) ........................ 10-2011-0090688

(51) Int. Cl.

| | |
|---|---|
| ***G06F 3/038*** | (2013.01) |
| ***G09G 3/20*** | (2006.01) |
| ***G06T 1/60*** | (2006.01) |
| ***G09G 5/36*** | (2006.01) |
| ***G09G 3/36*** | (2006.01) |

(52) U.S. Cl.

CPC .......... *G09G 3/2096* (2013.01); *G09G 2360/18* (2013.01); *G09G 2370/04* (2013.01); *G09G 5/36* (2013.01); *G09G 2320/103* (2013.01); *G09G 2330/021* (2013.01); *G09G 3/3648* (2013.01); *G09G 2310/0224* (2013.01)

USPC ............. 345/204; 345/205; 345/214; 345/55; 345/530; 345/545

(58) Field of Classification Search

None

See application file for complete search history.

(56) References Cited

U.S. PATENT DOCUMENTS

| | | | | |
|---|---|---|---|---|
| 6,952,298 | B2 | 10/2005 | Hara et al. | |
| 7,095,391 | B2 * | 8/2006 | Lee | 345/87 |
| 7,738,038 | B2 | 6/2010 | Kempf et al. | |
| 2003/0098828 | A1 * | 5/2003 | Hunter et al. | 345/76 |
| 2006/0044251 | A1 | 3/2006 | Kato et al. | |
| 2007/0146344 | A1 * | 6/2007 | Martin et al. | 345/173 |
| 2007/0164961 | A1 | 7/2007 | Koyama et al. | |
| 2009/0040156 | A1 * | 2/2009 | Jun et al. | 345/87 |
| 2009/0179847 | A1 | 7/2009 | Harada et al. | |
| 2009/0316033 | A1 * | 12/2009 | Uchida | 348/308 |
| 2010/0156961 | A1 | 6/2010 | Kim et al. | |
| 2010/0277503 | A1 * | 11/2010 | Sakamaki et al. | 345/619 |
| 2011/0310980 | A1 * | 12/2011 | Mathew | 375/240.26 |
| 2013/0033509 | A1 * | 2/2013 | Yamashita | 345/530 |
| 2013/0100173 | A1 * | 4/2013 | Chaji et al. | 345/690 |

FOREIGN PATENT DOCUMENTS

| | | | |
|---|---|---|---|
| JP | 3768097 | B | 2/2006 |
| JP | 2006-084758 | A | 3/2006 |
| JP | 2009-044438 | A | 2/2009 |
| KR | 100351514 | B1 | 8/2002 |
| KR | 10-0515343 | B | 9/2005 |
| KR | 10-0783695 | B | 12/2007 |

* cited by examiner

*Primary Examiner* — Maurice L McDowell, Jr.
*Assistant Examiner* — Donna J Ricks
(74) *Attorney, Agent, or Firm* — Innovation Counsel LLP

(57) ABSTRACT

In order to reduce power consumption of a display device when a still picture is to be displayed, a display area of the device is subdivided into a plurality of Still Picture Refresh Groups (SPRGoP's), with each SPRGoP consisting of n pixels. All n of the pixels are charged in every one of sequential frames when a motion picture mode is in effect. Less than all of the n pixels of each SPRGoP are refreshed in each frame of an N-frame refresh cycle when a still picture mode is in effect. Different schemes for cycling through the n pixels of each SPRGoP are disclosed.

19 Claims, 11 Drawing Sheets

DISPLAY DEVICE AND DRIVING METHOD THEREOF

CROSS-REFERENCE TO RELATED APPLICATION

This application claims priority to and the benefit of Korean Patent Application No. 10-2011-0090688 filed in the Korean Intellectual Property Office on Sep. 7, 2011, the entire contents of which application are incorporated herein by reference.

BACKGROUND (a) Field of Disclosure

The present disclosure of invention relates to a display device and a driving method thereof, and more particularly, to a display device capable of reducing power consumption and a driving method thereof.

(b) Description of Related Technology

A display device is often required for use as part of a computer monitor, a television set, a mobile phone and like image displaying devices which are widely used. The display device may include a cathode ray tube (CRT), a liquid crystal display (LCD), a plasma display, or the like.

The display device typically also includes a graphic processing unit (GPU) and a signal controller as well as the image display panel itself. Typically, the graphic processing unit (GPU) transmits an image data signal representing consecutive screens' worth of to-be-displayed imagery to the signal controller and the signal controller then responsively generates control signals for each of the consecutive screens (frames) for use in driving the display panel. The signal controller typically transmits the control signals together with the respective image data signals to the display panel to thereby timely drive the display device.

The imagery which can be displayed on the display panel may be classified as being either a still image or a motion picture image. The display panel generally displays several frames within each second. In this case, when the image data included in each of plural frames are the same as each other, a still image is displayed. On the other hand, when the image data included in each frame are different from each other, the motion picture may be thereby formed and displayed.

In a case where both a motion picture and a still image are to be displayed on the same display panel, even though the still image is a nonchanging one, the signal controller nonetheless typically has transmitted to it and it receives the same image data over and over again from the graphic processing unit (GPU) for each of many frames. Retransmission of the image data, even if it is the same data, consumes power and thus there is a problem in that power is unnecessarily consumed when a same image is to be displayed over and over again.

Recently, research for reducing the power consumption of display devices has been attempted. As one of several proposals, a method is suggested in which the image data of the still image is stored in a local frame memory of the signal controller by adding such a still image retaining frame memory into the signal controller and the so-stored image data is then provided to the display panel while displaying the still image rather than re-transmitting the same data and reprocessing it over and over. This is called a Pixel Self Refresh (PSR) mode. Since the image data does not need to be transmitted from the graphic processing unit (GPU) while displaying the still image, the graphic processing unit may be at least partially inactivated during this time, and as such, its power consumption may be reduced.

However, even in the case where the signal controller is driven in the PSR mode where the still image retaining frame memory has been added, there is an apparently unrecognized problem that power consumption is still unnecessarily large.

The above information disclosed in this Background of the Technology section is only for enhancement of understanding of the here disclosed inventive subject matter and therefore it may contain information that does not form part of the prior art as already known to persons of ordinary skill in the pertinent art.

SUMMARY

The present disclosure of invention provides a display device having advantages of further reducing power consumption and a driving method thereof.

An exemplary embodiment in accordance with the present teachings provides a display device including: a display panel for displaying a still image and a motion picture; a graphic processing unit for providing image data of the motion picture to the display panel when the motion picture is displayed on the display panel; and a frame memory for storing image data of the still image to provide the image data to the display panel when the still image is to be displayed on the display panel. The pixels of the display panel are subdivided into Still Picture Refresh Groups (SPRGoP's) or more simply, pixel groups each including n pixels, where all n of the pixels are recharged every frame when the motion picture mode is in effect and where only a subset of the n pixels are recharged in each of an N-frame refresh cycle when the still image displaying mode is in effect. In one embodiment, N=4 and the number n of pixels in the Still Picture Refresh Group is also four.

According to exemplary embodiments of the present invention, when the still image is displayed, the entire pixels are not recharged every frame, some pixels are recharged in the corresponding frame, and other pixels are recharged in the next frame, such that it is possible to reduce the power consumption.

That is, according to exemplary embodiments of the present disclosure of invention, when the still image mode is in effect, Von gate signals are applied to only some of the gate lines during each frame of an N-frame refresh cycle and drive voltages are applied to only some of the data lines during each frame while the other data lines are allowed to float. It is possible to reduce power consumption with such a scheme because at least one of the gate line drivers and data line drivers is driven at an effectively lower frequency during the still image displaying mode as compared to during the motion picture mode.

DETAILED DESCRIPTION

Figure 1:
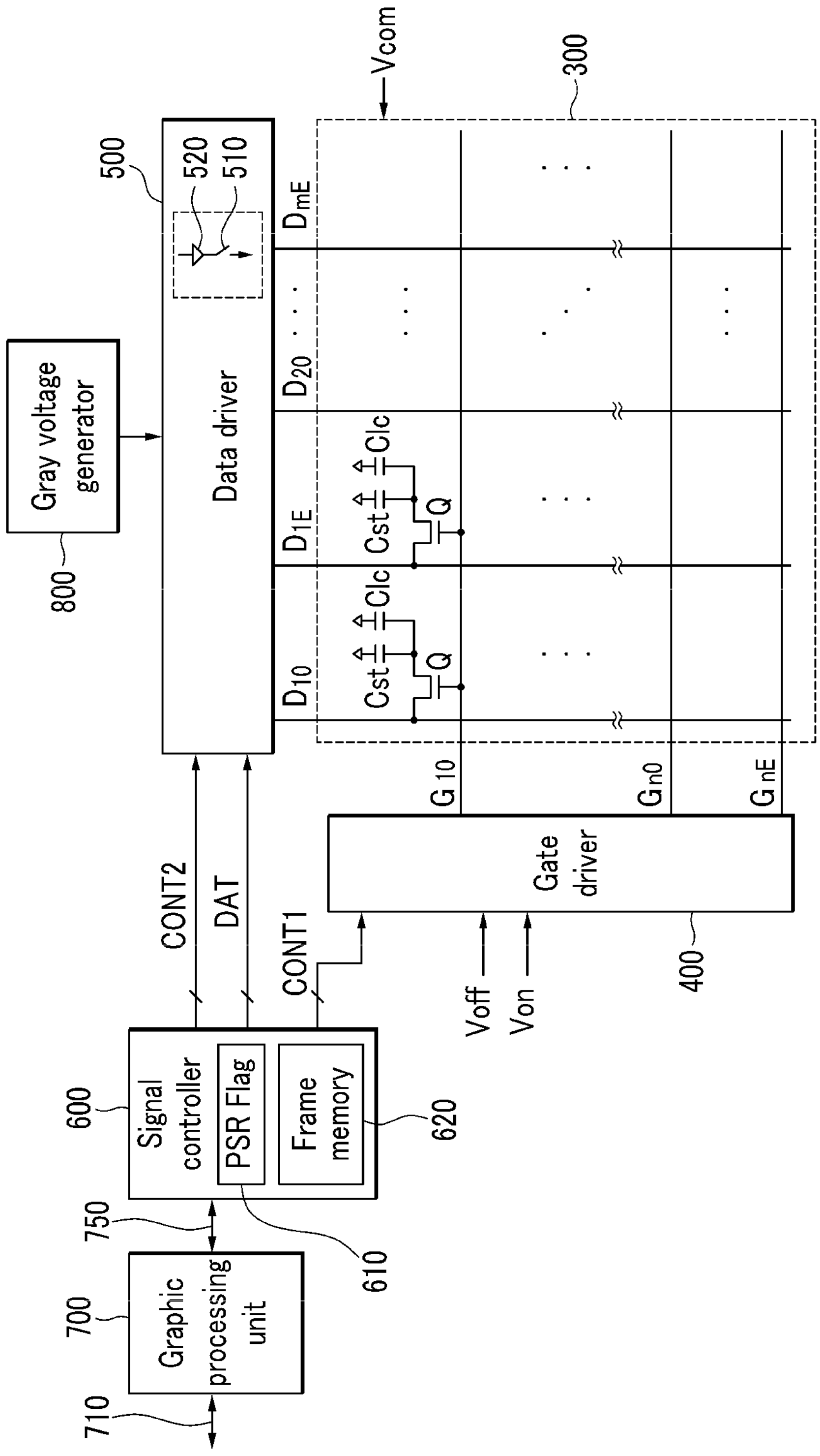
FIG. 1 is a block diagram of a display device according to a first exemplary embodiment that is able to operate in a PSR mode in accordance with the present disclosure of invention.

The present disclosure of invention will be provided more fully hereinafter with reference to the accompanying drawings, in which exemplary embodiments in accordance with the disclosure are shown. As those skilled in the art would realize in light of the present disclosure, the described embodiments may be modified in various different ways, all without departing from the spirit or scope of the present teachings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display device according to a first exemplary embodiment of the present invention will be described with reference to the accompanying drawings.

Figure 2:
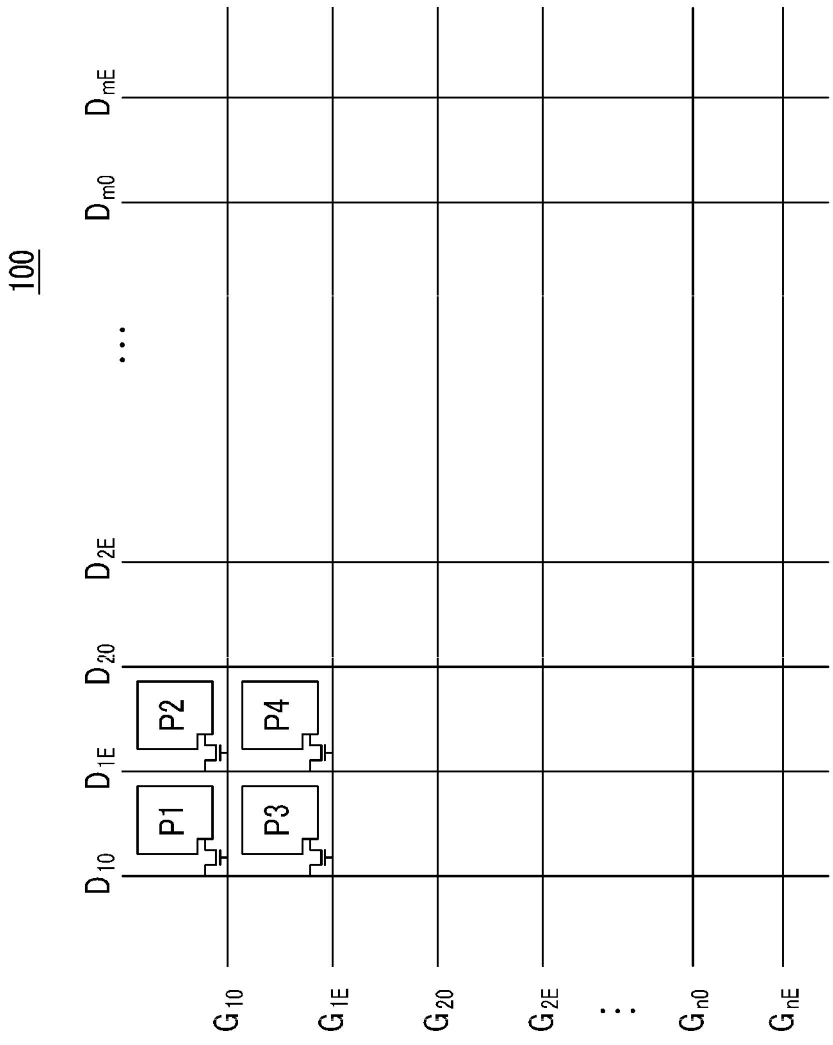
FIG. 2 is a diagram illustrating additional details for a display panel of a display device in accordance with the first exemplary embodiment.

FIG. 1 is a block diagram of a display device 100 configured according to a first exemplary embodiment. FIG. 2 is a diagram illustrating more details of a display panel that may be used in the display device 100 of FIG. 1.

As shown in FIG. 1, the display device 100 according to the first exemplary embodiment includes a display panel 300 configured for displaying an image, where the image can be, or can include a still image and a moving picture image. The display device 100 further includes a signal controller 600 configured for generating controlling signals for timely driving the display panel 300.

As mentioned, the whole or subdivided parts of the display panel 300 may be used for displaying a still image therein or a motion picture therein. If a plurality of sequential frames are to have the same image data (at least in their respective same subdivided part of the screen), the still image is displayed (e.g., in the respective same subdivided part of the screen). On the other hand, if the plurality of sequential frames are to have different image data, the motion picture is displayed (e.g., at least in the respective same subdivided part of the screen). In one embodiment, the signal controller 600 is responsive to control and data signals 750 sent to it from a controlling graphic processing unit (GPU) 700. The control and data signals 750 may include a Still Picture indicating flag (PSR flag) which indicates that the whole or at least one respective part of the screen is to provide a Still Picture. In one embodiment, the signal controller 600 includes a register or memory region 610 storing a true or false PSR flag and a corresponding PSR image buffer 620 storing image data for the respective Still Picture area of the screen.

The display panel 300 includes a plurality of sequentially ordered gate lines $G_{1O}$-$G_{nE}$ ($G_{nE}$ being the end one in the sequence) and a plurality of sequentially ordered data lines $D_{1O}$-$D_{mE}$ ($D_{mE}$ being the end one in the sequence). The plurality of gate lines $G_{1O}$-$G_{nE}$ extend in a horizontal direction, and the plurality of data lines $D_{1O}$-$D_{mE}$ cross the plurality of gate lines $D_{1O}$-$D_{1E}$ and extend in a vertical direction. Of importance, selectable ones of the data lines $D_{1O}$-$D_{mE}$ may be caused to selectably enter into an electrically insulated or floating state. This may be achieved for example, by use of selectable ones of disconnect switches (only one shown) 510 that disconnect the respective data lines from drivers in a data line driver portion 500 of the system 100. (Alternatively the data line drivers may be tri-state analog drivers that have a high-impedance output mode in addition to an analog voltage output mode.)

The gate lines $G_{1O}$-$G_{nE}$ and the data lines $D_{1O}$-$D_{mE}$ are connected with pixels such as $P_1$, $P_2$, $P_3$, and $P_4$ through respective switching elements Q of the respective pixels. A control terminal of the switching element Q is connected with the gate lines $G_{1O}$-$G_{nE}$, an input terminal thereof (source) is connected with the data lines $D_{1O}$-$D_{mE}$, and an output terminal thereof (drain) is connected with a liquid crystal capacitor $C_{LC}$ and a storage capacitor $C_{ST}$.

In the case of FIG. 2 (and corresponding FIGS. 3A-3D; 4A-4D; 5A-5D; 6A-6D), the pixels $P_1$, $P_2$, $P_3$, and $P_4$ are organized to define a respective Still Picture Refresh Group (SPRGoP) that corresponds to a refresh cycle consisting of four (4) sequential frames. More specifically, the illustrated SPRGoP of FIG. 2 consists of a first pixel $P_1$, a second pixel $P_2$, a third pixel $P_3$, and a fourth pixel $P_4$. It is to be understood that illustrated one SPRGoP of FIG. 2 is repeated across the whole of the screen so as to thereby tessellate the screen. Just one such Still Picture Refresh Group (SPRGoP) is shown for sake of avoiding illustrative clutter. In other words, the four illustrated pixels $P_1$, $P_2$, $P_3$, and $P_4$ of FIG. 2 form one pixel group whose subparts are to be sequentially refreshed (recharged) during a corresponding, four-frame refresh cycle. The four pixels $P_1$, $P_2$, $P_3$, and $P_4$ forming the illustrated one pixel group and the other Still Picture Refresh Groups (SPRGoP's—not shown) are disposed in a matrix form.

The gate lines $G_{1O}$-$G_{nE}$ are subdivided into SPRGoP support groups that respectively have, in the exemplary case, a respective first gate line $G_{1O}$, $G_{2O}$, . . . $G_{nO}$ and a respective second gate line $G_{1E}$, $G_{2E}$, . . . , $G_{nE}$. A respective pair of first and second gate lines such as $G_{1O}$-$G_{nE}$ form one gate line group.

The data lines $D_{1O}$-$D_{mE}$ are similarly subdivided into SPRGoP support groups that respectively have, in the exemplary case, a respective first data lines $D_{1O}$, $D_{2O}$, . . . , $D_{mO}$ and a respective second data line $D_{1E}$, $D_{2E}$, . . . , $D_{mE}$. A respective pair of first and second data lines such as $D_{1O}$-$D_{1E}$ form one data line group.

In the illustrated first example, only one pixel of the four pixels $P_1$, $P_2$, $P_3$, and $P_4$ forming one pixel group is recharged during a corresponding one frame of a four-frame refresh cycle. That is, when the first pixel $P_1$ is recharged in a first frame of the fact-finding, the second pixel $P_2$, the third pixel $P_3$, and the fourth pixel $P_4$ are not recharged but are instead left electrically floating (their respective liquid crystal capacitances $C_{LC}$ are used to then retain their respective electrical charge states). In addition, a single one of the second pixel $P_2$, the third pixel $P_3$, and the fourth pixel $P_4$ is alone recharged (refreshed) in the next frame. As described above, the first pixel $P_1$, the second pixel $P_2$, the third pixel $P_3$, and the fourth pixel $P_4$ are alternately recharged through four frames.

The first pixel $P_1$ of a given SPRGoP is connected the respective first gate line, $G_{1O}$, $G_{2O}$, . . . $G_{nO}$ of that group and to the respective first data line $D_{1O}$, $D_{2O}$, and $D_{mO}$ of that group. Accordingly, when activating gate signals are respectively applied to the first gate lines $G_{1O}$, $G_{2O}$, . . . $G_{nO}$ and driving data signals (as opposed to high impedance open circuits) are respectively applied to the first data lines, $D_{1O}$, $D_{2O}$, . . . $D_{mO}$, of a given SPRGoP, the first pixel $P_1$ of that group is recharged (refreshed with substantially the original drive voltage used to initially form the Still Picture).

The second pixel P2 of a given SPRGoP is connected with the respective first gate lines $G_{1O}$, $G_{2O}$, . . . $G_{nO}$ and the second data lines $D_{1E}$, $D_{2E}$, . . . , $D_{mE}$. Accordingly, when the gate signals are applied to the gate lines $G_{1O}$, $G_{2O}$, . . . , $G_{nO}$ and the data signals are applied to the second data lines $D_{1E}$, $D_{2E}$, . . . , $D_{mE}$, the second pixel $P_2$ is recharged.

The third pixel P3 is connected with the second gate lines $G_{1E}$, $G_{2E}$, . . . , $G_{nE}$ and the first data lines $D_{1O}$, $D_{2O}$, . . . , $D_{mO}$. Accordingly, when the gate signals are applied to the second gate lines $G_{1E}$, $G_{2E}$, . . . , $G_{nE}$ and the data signals are applied to the first data lines $D_{1O}$, $D_{2O}$, . . . , $D_{mO}$, the third pixel $P_3$ is recharged.

The fourth pixel $P_4$ is connected with the second gate lines $G_{1E}$, $G_{2E}$, . . . , $G_{nE}$ and the second data lines $D_{1E}$, $D_{2E}$, . . . , $D_{mE}$. Accordingly, when the gate signals are applied to the second gate lines $G_{1E}$, $G_{2E}$, . . . , $G_{nE}$ and the data signals are applied to the second data lines $D_{1E}$, $D_{2E}$, . . . , $D_{mE}$, the fourth pixel $P_4$ is recharged.

The display panel 300 of FIG. 1 is shown as a liquid crystal panel, but the display panel 300, to which the present teachings may be applied, may use various other forms of display panel such as an organic light emitting panel (OLED), an electrophoretic display panel, a plasma display panel, and the like other than the liquid crystal panel as long as each pixel has some means (e.g., a local capacitance) for substantially retaining its optical state until it receives a refresh signal (e.g., a recharging drive signal). More specifically, in the case of OLED's, each pixel typically includes a current-supplying transistor that supplies a steady flow of current to a corresponding organic LED and a respective capacitance for storing a current-determining voltage for that current-supplying transistor. It is the respective capacitance which is recharged in the refreshing frames of a four-frame refresh cycle (or frames of N-frame refresh cycle if N is other than four—see for example FIGS. 10A-10C where N is 3).

As shown in FIG. 1, the signal controller 600 includes a frame memory 620 that is usable for memorizing the image data DAT of a corresponding still image and a mode register (PSR flag) 610 that is usable for indicating when the PSR mode is active for the corresponding area of the display panel.

The display device 100 according to the exemplary embodiment may further include a graphic processing unit 700 and the graphic processing unit 700 transmits the image data DAT of each frame to be displayed in the display panel 300 to the signal controller 600 by way of link 750. The GPU 700 may be further operatively coupled by way of a control link 710 to a data processing unit (e.g., CPU) which provides higher level control signals, such as for example indicating how long a Still Picture is to be displayed.

When a motion picture is to be displayed on display panel 300, the graphic processing unit 700 transmits the corresponding image data DAT to the signal controller 600 every frame, optionally with an indication that the next frame will be different (that motion picture mode continues).

When the still image is to be displayed on the display panel 300, the signal controller 600 receives the image data DAT of the still image from the graphic processing unit 700 (optionally with an indication that the next X frames or groups of frames will be the same/unchanged). The signal controller 600 automatically responds to this by storing the received still image data DAT in the Still Picture frame memory 620. Then, the signal controller 600 sends back a control signal for temporarily inactivating the graphic processing unit 700 so that the graphic processing unit 700 does not transmit the image data DAT of the still image for every frame of a predetermined number of next frames. That is, when the still image is displayed on the display panel 300, the transmission of the image data DAT of the graphic processing unit 700 is interrupted (e.g., for X frames) and the display panel 300 is driven by using the image data DAT of the still image stored in the frame memory 620.

The signal controller 600 processes the image data DAT and the control signal so as to be suitable for an operation condition of the liquid crystal panel 300 in response to the image data DAT inputted from the graphic processing unit 700 and a control signal thereof, for example, a vertical synchronization signal Vsync, a horizontal synchronizing signal Hsync, a main clock signal MCLK, a data enable signal DE, and the like and then, generates and outputs a gate control signal CONT1 and a data control signal CONT2.

The display device according to the exemplary embodiment of FIGS. 1-2 may further include a gate driver 400 driving gate lines $G_{1O}$-$G_{nE}$ and a data driver 500 driving data lines $D_{1O}$-$D_{mE}$.

The plurality of gate lines $G_{1O}$-$G_{nE}$ of the display panel 300 are connected with the gate driver 400 and the gate driver 400 applies gate voltages (Von or Voff) to the gate lines $G_{1O}$-$G_{nE}$ according to the gate control signal CONT1 applied from the signal controller 600.

The plurality of data lines $D_{1O}$-$D_{mE}$ of the display panel 300 is connected to the data driver 500 and the data driver 500 receives the data control signal CONT2 and the image data DAT from the signal controller 600. The data driver 500 converts the image data DAT into data voltage by using gray voltage generated from a gray voltage generator 800 and transfers the data voltage to the data lines $D_{1O}$-$D_{mE}$.

Hereinafter, a first method driving the display device according to the first exemplary embodiment will be described with reference to FIGS. 3A to 3D.

FIGS. 3A to 3D are sequential diagrams illustrating the one pixel that is recharged for each of the frames in the four-frame refresh cycle that is used when a still image is displayed. In this case, the recharged pixel is represented by oblique lines (cross hatching). The data lines, $D_{10}$ and $D_{1E}$ for the respective Still Picture Refresh Group (SPRGoP) and their states (Driven versus Hi-Z) are also illustrated.

First, when the motion picture is displayed, the graphic processing unit 700 transmits the image data DAT of the motion picture to the signal controller 600, and the signal controller 600 transmits the gate control signal CONT1 to the gate driver 400 and transmits the image data DAT and the data control signal CONT2 to the data driver 500.

The gate driver 400 applies the gate signal to gate lines $G_{1O}$-$G_{nE}$ and the data driver 500 applies the data signal to the data lines $D_{1O}$-$D_{mE}$ and recharges all of the pixels $P_1$, $P_2$, $P_3$, and $P_4$ included in one pixel group every frame, thereby displaying a screen whose pixels are all refreshed in every frame. For example, when pixels of a 1024*768 matrix are included in the display device, all the pixels of 1024*768 are charged (e.g., overwritten or refreshed) in one frame.

Next, when the still image is displayed, the graphic processing unit 700 transmits the image data DAT of the still image together with a still image start signal (610) notifying a start of the still image to the signal controller 600. The signal controller 600 receives the still image start signal to recognize the start of the still image and stores the image data DAT of the still image in the corresponding frame memory 620. Further, the signal controller 600 may optionally inactivate the graphic processing unit 700 for a predetermined number (e.g., X=4) of frames so that the graphic processing unit 700 does not transmit the image data DAT of the still image any more during the deactivation period. The signal controller 600 transmits the image data DAT of the still image stored in the frame memory to the data driver 500.

The gate driver 400 alternately applies the Von gate signals to the first gate lines $G_{1O}$, $G_{2O}$, . . . , $G_{nO}$ and then to the second gate lines $G_{1E}$, $G_{2E}$, . . . , $G_{nE}$ in alternating frames. The data driver 500 alternately applies the data signals to the first data lines $D_{1O}$, $D_{2O}$, . . . , $D_{mO}$ and the second data lines $D_{1E}$, $D_{2E}$, . . . , $D_{mE}$ in alternating sets of every two-frames each. Accordingly, the pixels $P_1$, $P_2$, $P_3$, and $P_4$ included in one pixel group are alternately recharged on a four-frame cycle, thereby displaying the screen but using less energy to charge the screen than that used when motion pictures are displayed. For example, when pixels of 1024*768 are included in the display device, the pixels of 1024*768*¼ are recharged in one frame. Subsequently, other pixels of 1024*768*¼ are recharged in the next frame. As described above, the pixels of 1024*768 are recharged through four frames. Additionally, the GPU is not needed for transmitting new image data (750) during that time and energy of transmission may be saved.

Figure 3A:
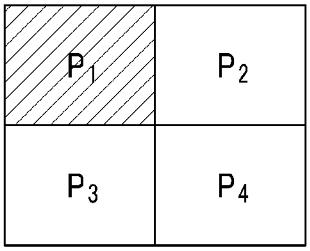
FIGS. 3A to 3D are diagrams illustrating an example of a Still Picture Refresh Group Of Pixels (SPRGoP) whose pixels are alternatingly recharged (refreshed) in turn in respective ones of a corresponding sequence of Still Picture providing frames when a still image is being displayed, where the sequence of pixel refreshing is in accordance with a first exemplary method of the present disclosure of invention.

In detail, as shown in FIG. 3A, the gate signals are selectively applied to the first gate lines $G_{1O}$, $G_{2O}$, . . . , $G_{nO}$ and the data signals are selectively applied (or not) to the first data lines $D_{1O}$, $D_{2O}$, . . . , $D_{mO}$ in the first frame displaying the still image, such that in the first frame, only the first pixel $P_1$ of the illustrated Still Picture Refresh Group (SPRGoP) is recharged. Since Von signals are not applied to the second gate lines $G_{1E}$, $G_{2E}$, . . . , $G_{nE}$ and since driving voltages are not applied to the second data lines $D_{1E}$, $D_{2E}$, . . . , $D_{mE}$ in the first frame, the second pixel $P_2$, the third pixel $P_3$, and the fourth pixel $P_4$ are not recharged but instead retain on their own whatever charge value is left of the original charge they were given when the Still Picture was initially charged into all pixels. FIG. 3A shows that during the first frame, data line $D_{10}$ is driven while data line $D_{1E}$ is in a high impedance (Hi-Z) state. Von is applied to the top row of pixels and Voff is applied to the bottom row of pixels.

Figure 3B:
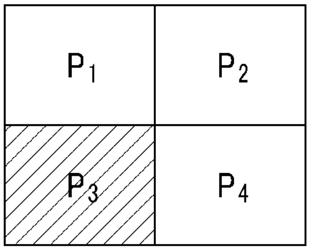

As shown in FIG. 3B for the next sequential frame, the Von gate signals are now selectively applied to the second gate lines $G_{1E}$, $G_{2E}$, . . . , $G_{nE}$ and the data signals are again selectively applied to the first data lines $D_{1O}$, $D_{2O}$, . . . , $D_{mO}$ in the second frame, such that only the third pixel $P_3$ is recharged in the illustrated Still Picture Refresh Group (SPR-GoP). Since the Von signals are not applied to the first gate lines $G_{1O}$, $G_{2O}$, . . . , $G_{nO}$ and since driving voltages are not applied to the second data lines $D_{1E}$, $D_{2E}$, . . . , $D_{mE}$ in the second frame, the first pixel $P_1$, the second pixel $P_2$, and the fourth pixel $P_4$ are not recharged.

Figure 3C:
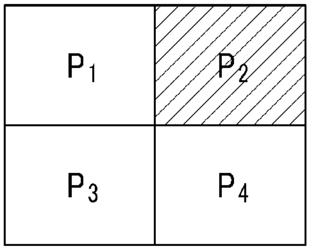

As shown in FIG. 3C, the gate signals are applied to the first gate lines $G_{1O}$, $G_{2O}$, . . . , $G_{nO}$ and the data signals are applied to the second data lines $D_{1E}$, $D_{2E}$, . . . , $D_{mE}$ in the third frame, such that only the second pixel $P_2$ is recharged. Since the signals are not applied to the second gate lines $G_{1E}$, $G_{2E}$, . . . , $G_{nE}$ and to the first data lines $D_{1O}$, $D_{2O}$, . . . , $D_{mO}$ in the third frame, the first pixel $P_1$, the third pixel $P_3$, and the fourth pixel $P_4$ are not recharged.

Figure 3D:
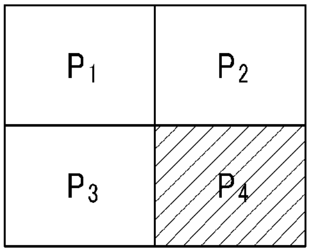

As shown in FIG. 3D, the Von gate signals are applied to the second gate lines $G_{1E}$, $G_{2E}$, . . . , $G_{nE}$ and the data signals are selectively applied only to the second data lines $D_{1E}$, $D_{2E}$, . . . , $D_{mE}$ in the fourth frame, such that only the fourth pixel $P_4$ is recharged. Since the signals are not applied to the first gate lines $G_{1O}$, $G_{2O}$, . . . , $G_{nO}$ and the first data lines $D_{1O}$, $D_{2O}$, . . . , $D_{mO}$ in the fourth frame, the first pixel $P_1$, the second pixel $P_2$, and the third pixel $P_3$ are not recharged.

Next, in the fifth frame, the state shown in FIG. 3A is repeated so that only the first pixel $P_1$ is recharged again. In the same manner, the first to fourth pixels $P_1$, $P_2$, $P_3$, and $P_4$ are alternately recharged on a four-frame cycle basis, thereby displaying the still image for yet another four frames. In one embodiment, the PSR flag register (610 in FIG. 1) stores a value indicating how many four-frame refresh cycles are to be carried out and that value is decremented each a next four-frame refresh cycle is carried out. When the PSR flag register 610 stores a zero (0), that indicates that the motion picture mode is back in effect.

When the still image is displayed in the above manner and then when the requested number of four-frame refresh cycles are carried out, the motion picture mode starts again, the graphic processing unit 700 is reactivated and instructed (by the signal controller 600 via link 750) to transmit the image data DAT of either a motion picture or a next Still Picture to the signal controller 600. Further, at the start of either a new motion picture mode or a next Still Picture mode, all the pixels $P_1$, $P_2$, $P_3$, and $P_4$ are recharged at least in the first frame and if motion picture mode is true, also in every subsequent frame so as to display a fully refreshed image on the screen.

As described above, the display device according to the first exemplary embodiment recharges and drives different pixels in respective ones of an N-frame refresh cycle (e.g., N=4) when the still image mode is in effect. However, the present teachings are not limited to the N=4 value. For example, different pixels may be alternately recharged and driven every two-frames (N=2) or every three frames (N=3) as another nonlimiting example (see FIGS. 10A-10C). Although not shown, for an N=8 example, in the first and second frames only the first pixel $P_1$ may be recharged, in the third and fourth frames only the third pixel $P_3$ may be recharged, in the fifth and sixth frames only the second pixel $P_2$ may be recharged, and in the seventh and eighth frames only the fourth pixel $P_4$ may be recharged. That is, the first to fourth pixels $P_1$, $P_2$, $P_3$, and $P_4$ are alternately recharged every two-frames over the course of an eight-frame cycle, thereby displaying the still image.

The display device according to the first exemplary embodiment of the present invention may be driven by a method different from the method described above and hereinafter, a second method of driving the display device will be described with reference to FIGS. 4A to 4D.

FIGS. 4A to 4D are diagrams illustrating respective ones of a 4-pixels group being individually recharged in sequence over a four-frame refresh cycle when a still image mode is in effect but where the driving of the display device is according to second method.

Since the method of displaying the motion picture is the same as for the first method, the description thereof is omitted and hereinafter, a method of displaying the still image will be described.

The gate driver 400 alternately applies the gate signals to the first gate lines $G_{1O}$, $G_{2O}$, . . . , $G_{nO}$ and the second gate lines $G_{1E}$, $G_{2E}$, . . . , $G_{nE}$ each for two-frames. The data driver 500 alternately applies the data signals to the first data lines $D_{1O}$, $D_{2O}$, . . . , $D_{mO}$ and the second data lines $D_{1E}$, $D_{2E}$, . . . , $D_{mE}$ every one frame. Accordingly, the pixels $P_1$, $P_2$, $P_3$, and $P_4$ included in one pixel group are alternately recharged on a four-frame cycle basis, thereby displaying the Still Picture on the screen while driving the gate driver 400 at a reduced frequency.

Figure 4A:
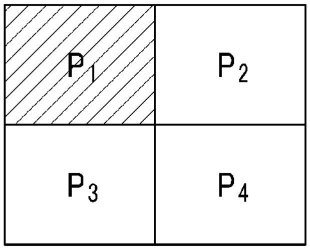
FIGS. 4A to 4D are diagrams illustrating pixels recharged for each frame in sequence when a still image is displayed by driving the display device according to the first exemplary embodiment of the present invention by a second method.

In detail, as shown in FIG. 4A, the gate signals are applied to the first gate lines $G_{1O}$, $G_{2O}$, . . . , $G_{nO}$ and the data signals are applied to the first data lines $D_{1O}$, $D_{2O}$, . . . , $D_{mO}$ in the first frame of a four-frame refresh cycle such that only the first pixel $P_1$ is recharged in the first frame. Since the signals are not applied to the second gate lines $G_{1E}$, $G_{2E}$, . . . , $G_{nE}$ and to the second data lines $D_{1E}$, $D_{2E}$, . . . , $D_{mE}$ in the first frame, the second pixel $P_2$, the third pixel $P_3$, and the fourth pixel $P_4$ are not recharged.

Figure 4B:
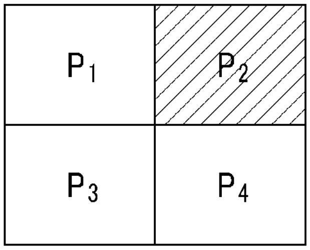

As shown in FIG. 4B, the gate signals are applied to the first gate lines $G_{1O}$, $G_{2O}$, . . . , $G_{nO}$ and the data signals are applied to the second data lines $D_{1E}$, $D_{2E}$, . . . , $D_{mE}$ in the second frame, such that only the second pixel $P_2$ is recharged. Since the signals are not applied to the second gate lines $G_{1E}$, $G_{2E}$, . . . , $G_{nE}$ and to the first data lines $D_{1O}$, $D_{2O}$, . . . , $D_{mO}$ in the second frame, the first pixel $P_1$, the third pixel $P_3$, and the fourth pixel $P_4$ are not recharged.

Figure 4C:
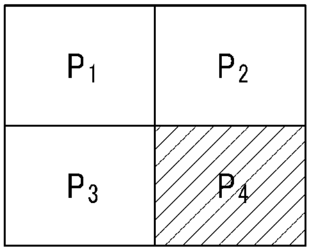

As shown in FIG. 4C, the gate signals are applied to the second gate lines $G_{1E}$, $G_{2E}$, . . . , $G_{nE}$ and the data signals are applied to the second data lines $D_{1E}$, $D_{2E}$, . . . , $D_{mE}$ in the third frame, such that only the fourth pixel $P_4$ is recharged. Since the signals are not applied to the first gate lines $G_{1O}$, $G_{2O}$, . . . , $G_{nO}$ and to the first data lines $D_{1O}$, $D_{2O}$, . . . , $D_{mO}$ in the third frame, the first pixel $P_1$, the second pixel $P_2$, and the third pixel $P_3$ are not recharged.

Figure 4D:
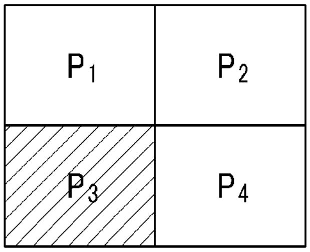

As shown in FIG. 4D, the gate signals are applied to the second gate lines $G_{1E}$, $G_{2E}$, . . . , $G_{nE}$ and the data signals are applied to the first data lines $D_{1O}$, $D_{2O}$, . . . , $D_{mO}$ in the fourth frame, such that only the third pixel $P_3$ is recharged. Since the signals are not applied to the first gate lines $G_{1O}$, $G_{2O}$, . . . , $G_{nO}$ and to the second data lines $D_{1E}$, $D_{2E}$, . . . , $D_{mE}$ in the fourth frame, the first pixel $P_1$, the second pixel $P_2$, and the fourth pixel $P_4$ are not recharged.

Next, in a fifth frame, as shown by recycling to FIG. 4A, the first pixel $P_1$ is alone recharged again. In the same manner, the first to fourth pixels $P_1$, $P_2$, $P_3$, and $P_4$ are alternately recharged on a four-frame cycle, thereby displaying the still image.

Hereinafter, a third method of driving the display device will be described with reference to FIGS. 5A to 5D.

FIGS. 5A to 5D are diagrams illustrating pixels recharged for each frame in sequence when a still image is to be displayed by driving the display device according to the third method.

The gate driver 400 alternately applies the gate signals to the first gate lines $G_{1O}$, $G_{2O}$, . . . , $G_{nO}$ and the second gate lines $G_{1E}$, $G_{2E}$, . . . , $G_{nE}$ each for every two-frames. The data driver 500 alternately applies the data signals to the first data lines $D_{1O}$, $D_{2O}$, . . . , $D_{mO}$ and the second data lines $D_{1E}$, $D_{2E}$, . . . , $D_{mE}$ every frame. Accordingly, the pixels $P_1$, $P_2$, $P_3$, and $P_4$ included in one pixel group are alternately recharged on a four-frame cycle, thereby displaying the Still Picture across the screen (or a subpart thereof if the screen is subdivided into subparts that can each have its own still-versus-motion picture mode).

Figure 5A:
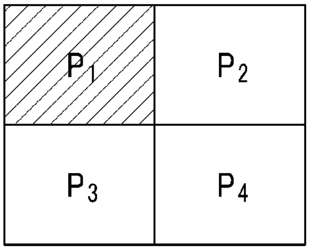
FIGS. 5A to 5D are diagrams illustrating pixels recharged for each frame in sequence when a still image is displayed by driving the display device according to the first exemplary embodiment of the present invention by a third method.

As shown in FIG. 5A, the gate signals are applied to the first gate lines $G_{1O}$, $G_{2O}$, . . . , $G_{nO}$ and the data signals are applied to the first data lines $D_{1O}$, $D_{2O}$, . . . , $D_{mO}$ in the first frame displaying the still image, such that only the first pixel $P_1$ is recharged. Since the signals are not applied to the second gate lines $G_{1E}$, $G_{2E}$, . . . , $G_{nE}$ and the second data lines $D_{1E}$, $D_{2E}$, . . . , $D_{mE}$ in the first frame, the second pixel $P_2$, the third pixel $P_3$, and the fourth pixel $P_4$ are not recharged.

Figure 5B:
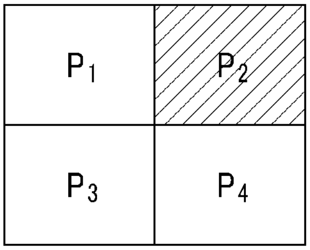

As shown in FIG. 5B, the gate signals are applied to the first gate lines $G_{1O}$, $G_{2O}$, . . . , $G_{nO}$ and the data signals are applied to the second data lines $D_{1E}$, $D_{2E}$, . . . , $D_{mE}$ in the second frame, such that only the second pixel $P_2$ is recharged. Since the signals are not applied to second gate lines $G_{1E}$, $G_{2E}$, . . . , $G_{nE}$ and the first data lines $D_{1O}$, $D_{2O}$, . . . , $D_{mO}$ in the second frame, the first pixel $P_1$, the third pixel $P_3$, and the fourth pixel $P_4$ are not recharged.

Figure 5C:
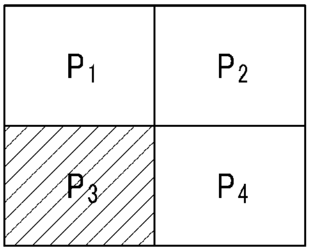

As shown in FIG. 5C, the gate signals are applied to the second gate lines $G_{1E}$, $G_{2E}$, . . . , $G_{nE}$ and the data signals are applied to the first data lines $D_{1O}$, $D_{2O}$, . . . , $D_{mO}$ in the third frame, such that only the third pixel $P_3$ is recharged. Since the signals are not applied to the first gate lines $G_{1O}$, $G_{2O}$, . . . , $G_{nO}$ and the second data lines $D_{1E}$, $D_{2E}$, . . . , $D_{mE}$ in the third frame, the first pixel $P_1$, the second pixel $P_2$, and the fourth pixel $P_4$ are not recharged.

Figure 5D:
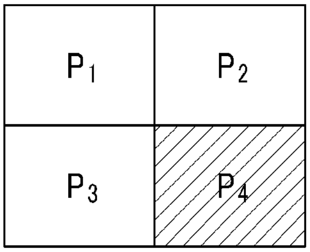

As shown in FIG. 5D, the gate signals are applied to the second gate lines $G_{1E}$, $G_{2E}$, . . . , $G_{nE}$ and the data signals are applied to the second data lines $D_{1E}$, $D_{2E}$, . . . , $D_{mE}$ in the fourth frame, such that only the fourth pixel $P_4$ (of the illustrated group) is recharged. Since the signals are not applied to the first gate lines $G_{1O}$, $G_{2O}$, . . . , $G_{nO}$ and the first data lines $D_{1O}$, $D_{2O}$, . . . , $D_{mO}$ in the fourth frame, the first pixel $P_1$, the second pixel $P_2$, and the third pixel $P_3$ are not recharged.

Hereinafter, a fourth method of driving the display device 100 will be described with reference to FIGS. 6A to 6D.

FIGS. 6A to 6D are diagrams illustrating pixels recharged for each frame in sequence when a still image mode is in effect according to a fourth method.

The gate driver 400 alternately applies the gate signals to the first gate lines $G_{1O}$, $G_{2O}$, . . . , $G_{nO}$ and the second gate lines $G_{1E}$, $G_{2E}$, . . . , $G_{nE}$ each for every two-frames. The data driver 500 alternately applies the data signals to the first data lines $D_{1O}$, $D_{2O}$, . . . , $D_{mO}$ and the second data lines $D_{1E}$, $D_{2E}$, . . . , $D_{mE}$ every frame. Accordingly, the pixels $P_1$, $P_2$, $P_3$, and $P_4$ included in one pixel group are alternately recharged on a four-frame cycle, thereby displaying the Still Picture.

Figure 6A:
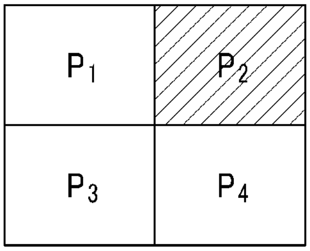
FIGS. 6A to 6D are diagrams illustrating pixels recharged for each frame in sequence when a still image is displayed by driving the display device according to the first exemplary embodiment of the present invention by a fourth method.

As shown in FIG. 6A, the gate signals are applied to the first gate lines $G_{1O}$, $G_{2O}$, . . . , $G_{nO}$ and the data signals are applied to the second data lines $D_{1E}$, $D_{2E}$, . . . , $D_{mE}$ in the first frame displaying the still image, such that only the second pixel $P_2$ is recharged. Since the signals are not applied to the second gate lines $G_{1E}$, $G_{2E}$, . . . , $G_{nE}$ and the first data lines $D_{1O}$, $D_{2O}$, . . . , $D_{mO}$ in the first frame, the first pixel $P_1$, the third pixel $P_3$, and the fourth pixel $P_4$ are not recharged.

Figure 6B:
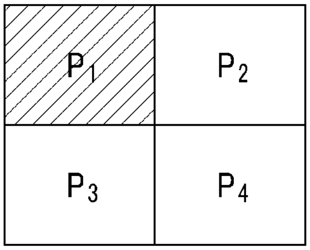

As shown in FIG. 6B, the gate signals are applied to the first gate lines $G_{1O}$, $G_{2O}$, . . . , $G_{nO}$ and the data signals are applied to the first data lines $D_{1O}$, $D_{2O}$, . . . , $D_{mO}$ in the second frame, such that only the first pixel $P_1$ is recharged. Since the signals are not applied to the second gate lines $G_{1E}$, $G_{2E}$, . . . , $G_{nE}$ and the second data lines $D_{1E}$, $D_{2E}$, . . . , $D_{mE}$ in the second frame, the second pixel $P_2$, the third pixel $P_3$, and the fourth pixel $P_4$ are not recharged.

Figure 6C:
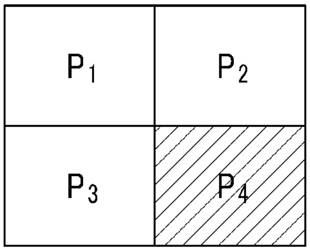

As shown in FIG. 6C, the gate signals are applied to the second gate lines $G_{1E}$, $G_{2E}$, . . . , $G_{nE}$ and the data signals are applied to the second data lines $D_{1E}$, $D_{2E}$, . . . , $D_{mE}$ in the third frame, such that only the fourth pixel $P_4$ is recharged. Since the signals are not applied to the first gate lines $G_{1O}$, $G_{2O}$, . . . , $G_{nO}$ and the first data lines $D_{1O}$, $D_{2O}$, . . . , $D_{mO}$ in the third frame, the first pixel $P_1$, the second pixel $P_2$, and the third pixel $P_3$ are not recharged.

Figure 6D:
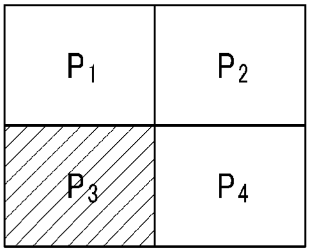

As shown in FIG. 6D, the gate signals are applied to the second gate lines $G_{1E}$, $G_{2E}$, . . . , $G_{nE}$ and the data signals are applied to the first data lines $D_{1O}$, $D_{2O}$, . . . , $D_{mO}$ in the fourth frame, such that only the third pixel $P_3$ is recharged. Since the signals are not applied to the first gate lines $G_{1O}$, $G_{2O}$, . . . , $Gn_O$ and the second data lines $D_{1E}$, $D_{2E}$, . . . , $D_{mE}$ in the fourth frame, the first pixel $P_1$, the second pixel $P_2$, and the fourth pixel $P_4$ are not recharged.

Next, in the fifth frame, the method may recycle to FIG. 6A, such that the second pixel $P_2$ is alone recharged again. In the same manner, the first to fourth pixels $P_1$, $P_2$, $P_3$, and $P_4$ are alternately recharged alone on a four-frame cycle, thereby displaying the still image.

Subsequently, a display device 101 according to a second exemplary embodiment will be described below with reference to the accompanying drawings.

The largest difference between the first exemplary embodiment 100 and the second exemplary embodiment 102 is that pixels forming one Still Picture Refresh Group (SPRGoP) are disposed in a line (same row and same gate line e.g., G1) in the second exemplary embodiment 102 and hereinafter, the second exemplary embodiment will be described in more detail.

Figure 7:
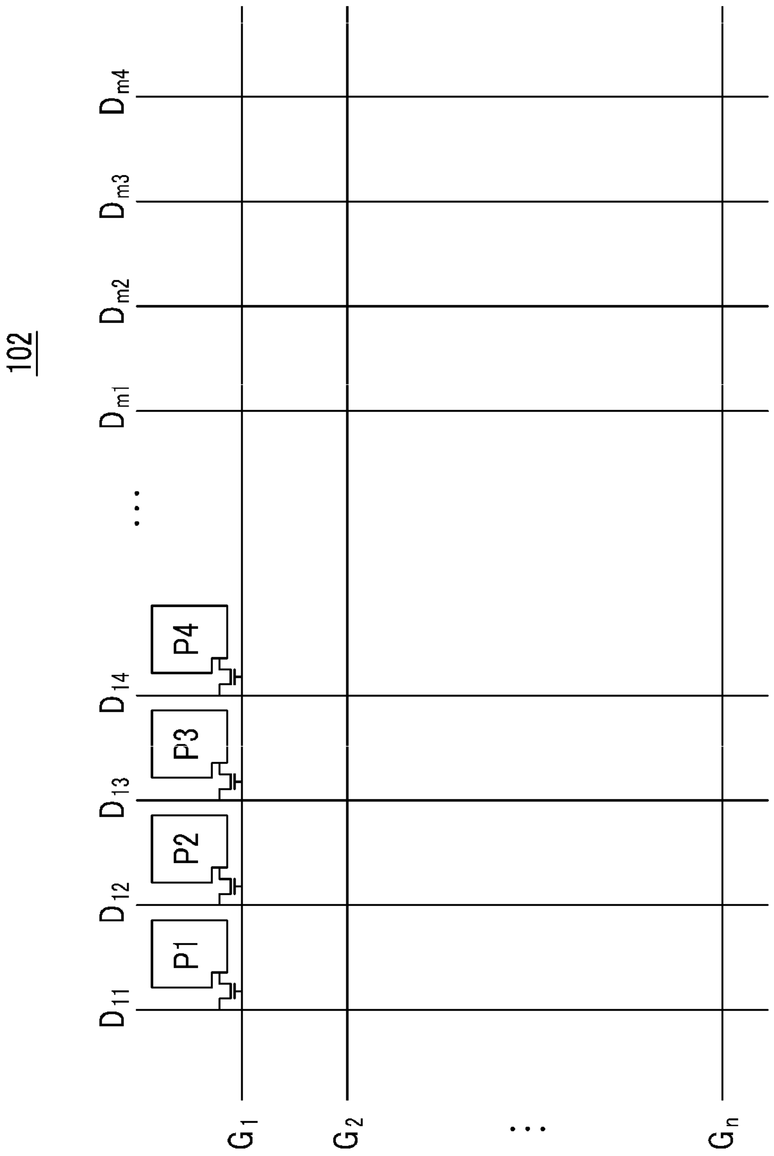
FIG. 7 is a diagram illustrating a display panel of a display device according to a second exemplary embodiment of the present invention.

FIG. 7 is a diagram illustrating a display panel of a display device according to a second exemplary embodiment 102.

Since the display device according to the second exemplary embodiment of the is almost the same as the display device according to the first exemplary embodiment 101, the description thereof is omitted and only different parts will be described below.

The display device according to the second exemplary embodiment 102 is the same as the display device according to the first exemplary embodiment in that the display device includes the display panel for displaying the image, the signal controller for controlling the signals for driving the display panel, and the graphic processing unit for transmitting the image data of each frame to the signal controller when displaying the motion picture.

The display panel includes a plurality of gate lines $G_1$-Gn and a plurality of data lines $D_{11}$-$D_{m4}$, the plurality of gate lines $G_1$-Gn extend in a horizontal direction, and the plurality of data lines $D_{11}$-$D_{m4}$ cross the plurality of gate lines $G_1$-Gn and extend in a vertical direction.

The gate lines $G_1$-Gn and the data lines $D_{11}$-$D_{m4}$ are connected with pixels $P_1$, $P_2$, $P_3$, and $P_4$ through respective switching elements.

The pixels $P_1$, $P_2$, $P_3$, and $P_4$ are configured by a first pixel $P_1$, a second pixel $P_2$, a third pixel $P_3$, and a fourth pixel $P_4$ and the four pixels $P_1$, $P_2$, $P_3$, and $P_4$ form one pixel group (SPRGoP). The four pixels $P_1$, $P_2$, $P_3$, and $P_4$ forming one pixel group are disposed in respective gate lines $G_1$-Gn in the X direction in a line.

The gate lines $G_1$-Gn are configured by a plurality of gate lines $G_1$-Gn and a separate gate line group is not formed.

The data lines $D_{11}$-$D_{m4}$ are configured by first data lines $D_{11}$ and $D_{m1}$, second data lines $D_{12}$ and $D_{m2}$, third data lines $D_{13}$ and $D_{m3}$, and fourth data lines $D_{14}$ and $D_{m4}$ and the four data lines $D_{11}$-$D_{m4}$ form one data line group.

Only one pixel of the four pixels $P_1$, $P_2$, $P_3$, and $P_4$ forming one pixel group is recharged in one frame. That is, when the first pixel $P_1$ is recharged in one frame, the second pixel $P_2$, the third pixel $P_3$, and the fourth pixel $P_4$ are not recharged. In addition, any one of the second pixel $P_2$, the third pixel $P_3$, and the fourth pixel $P_4$ is recharged in the next frame. As described above, the first pixel $P_1$, the second pixel $P_2$, the third pixel $P_3$, and the fourth pixel $P_4$ are alternately recharged through four frames.

The first pixel $P_1$ is connected its respective one of the gate lines $G_1$-Gn and its respective one of the first data lines $D_{11}$ and $D_{m1}$. Accordingly, when gate signals are applied to the gate lines $G_1$-Gn and data signals are applied to the first data lines $D_{11}$ and $D_{m1}$, the first pixel $P_1$ is recharged.

The second pixel P2 is connected with its respective one of the gate lines $G_1$-Gn and its respective one of the second data lines $D_{12}$ and $D_{m2}$. Accordingly, when Von gate signals are applied to the gate lines $G_1$-Gn and data signals are applied to the second data lines $D_{12}$ . . . , $D_{m2}$, the respective second pixels $P_2$ of corresponding refreshed groups are recharged.

The third pixel P3 is connected with its respective one of the gate lines $G_1$-Gn and with its respective one of the third data line $D_{13}$ . . . , $D_{m3}$. Accordingly, when the Von gate signals are applied to the gate lines $G_1$-Gn and the data signals are applied to the third data line $D_{13}$ . . . , $D_{m3}$, the third pixel $P_3$ is recharged.

The fourth pixel $P_4$ is connected with its respective one of the gate lines $G_1$-Gn and with its respective one of the fourth data line $D_{14}$ and $D_{m4}$. Accordingly, when the Von gate signals are applied to the gate lines $G_1$-Gn and the data signals are applied to the fourth data line $D_{14}$ . . . , $D_{m4}$, the respective fourth pixels $P_4$ are recharged.

Hereinafter, a method of driving the display device according to the second exemplary embodiment 102 will be described with reference to FIGS. 8A *to* 8D.

FIGS. 8A to 8D are diagrams illustrating pixels recharged for each frame in a four-frame refresh cycle when a still image mode is in effect within the second exemplary embodiment 102.

Since the method of displaying the motion picture is the same as the method of driving the display device according to the first exemplary embodiment, the description thereof is omitted and hereinafter, a method of displaying the still image will be described.

The gate driver applies gate signals to the gate lines $G_1$-Gn every frame in the same manner as the case where the motion picture is displayed. The data driver On the other hand, alternately applies data signals to the first to fourth data lines $D_{11}$-$D_{m4}$ in respective ones of the four-frame refresh cycle. Accordingly, the pixels $P_1$, $P_2$, $P_3$, and $P_4$ included in one pixel group are alternately recharged on a four-frame cycle basis, thereby displaying the Still Picture.

Figure 8A:
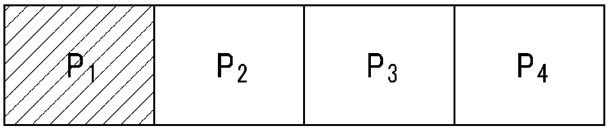
FIGS. 8A to 8D are diagrams illustrating pixels recharged for each frame in sequence when a still image is displayed by driving the display device according to the second exemplary embodiment of the present invention.

In detail, as shown in FIG. 8A, the gate signals are applied to the gate lines $G_1$-Gn and the data drive signals are only applied to the first data lines $D_{11}$ . . . , $D_{m1}$ in the first frame displaying the still image, such that the respective first pixels $P_1$ are each recharged. Since the signals are not applied to the second gate lines $D_{12}$ . . . , $D_{m2}$, the third data lines $D_{13}$ . . . , $D_{m3}$, and the fourth data lines $D_{14}$ . . . , $D_{m4}$ in the first frame, the second pixel $P_2$, the third pixel $P_3$, and the fourth pixel $P_4$ are not recharged.

Figure 8B:
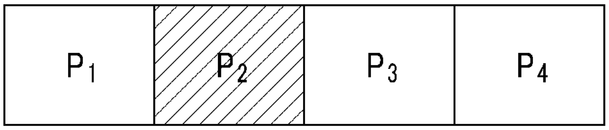

As shown in FIG. 8B, the gate signals are applied to the gate lines $G_1$-Gn and the data signals are applied to the second data lines $D_{12}$ . . . , $D_{m2}$ in the second frame, such that only the second pixel $P_2$ is recharged. Since the signals are not applied to the first data lines $D_{11}$ . . . , $D_{m1}$, the third data lines $D_{13}$ . . . , $D_{m3}$, and the fourth data lines $D_{14}$ . . . , $D_{m4}$ in the second frame, the first pixel $P_1$, the third pixel $P_3$, and the fourth pixel $P_4$ are not recharged.

Figure 8C:
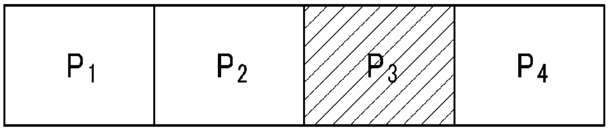

As shown in FIG. 8C, the gate signals are applied to the gate lines $G_1$-Gn and the data signals are applied to the third data lines $D_{13}$ . . . , $D_{m3}$ in the third frame, such that only the third pixel $P_3$ is recharged. Since the signals are not applied to the first data lines $D_{11}$ . . . , $D_{m1}$, the second data lines $D_{12}$ . . . , $D_{m2}$, and the fourth data lines $D_{14}$ . . . , $D_{m4}$ in the third frame, the first pixel $P_1$, the second pixel $P_2$, and the fourth pixel $P_4$ are not recharged.

Figure 8D:
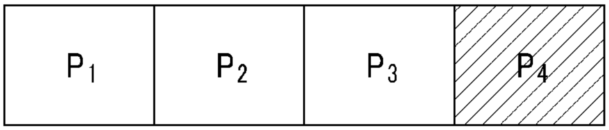

As shown in FIG. 8D, the gate signals are applied to the gate lines $G_1$-Gn and the data signals are applied to the fourth data lines $D_{14}$ . . . , $D_{m4}$ in the fourth frame, such that only the fourth pixels $P_4$ of the respective groups are recharged. Since the signals are not applied to the first data lines $D_{11}$ . . . , $D_{m1}$, the second data lines $D_{12}$ . . . , $D_{m2}$, and the third data lines $D_{13}$ . . . , $D_{m3}$ in the fourth frame, the first pixel $P_1$, the second pixel $P_2$, and the third pixel $P_3$ are not recharged.

Next, in the fifth frame, as shown in FIG. 8A, the first pixel $P_1$ is individually recharged again. In the same manner, the first to fourth pixels $P_1$, $P_2$, $P_3$, and $P_4$ are alternately recharged on a four-frame cycle, thereby displaying the still image.

Subsequently, a display device according to a third exemplary embodiment 103 of the present disclosure will be described below with reference to the accompanying drawings.

The largest difference between the first exemplary embodiment 100 and the third exemplary embodiment 103 is that the number of pixels forming one pixel group is nine in the third exemplary embodiment 103 and hereinafter, the third exemplary embodiment will be described in more detail.

Figure 9:
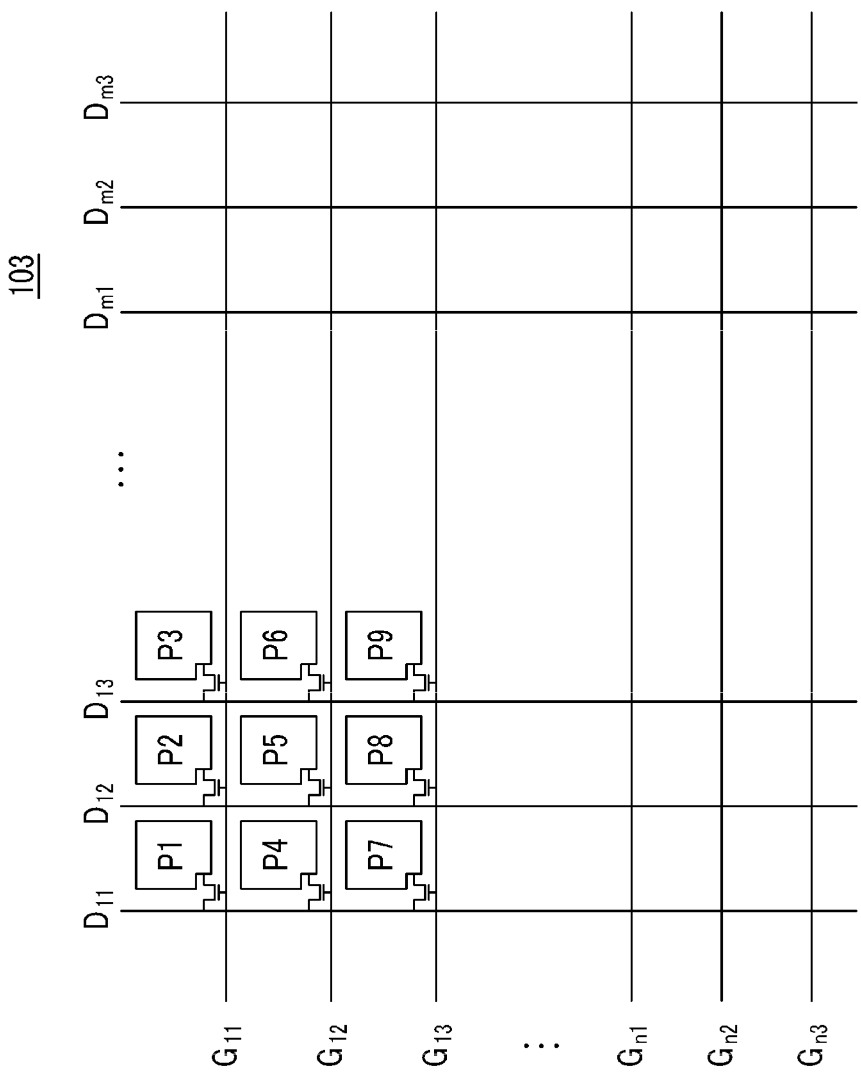
FIG. 9 is a diagram illustrating a display panel of a display device according to a third exemplary embodiment of the present invention.

FIG. 9 is a diagram illustrating a display panel of a display device according to a third exemplary embodiment.

Since the display device according to the third exemplary embodiment of the present invention is substantially the same as the display device according to the first exemplary embodiment, the description thereof is omitted and only different parts will be described below.

The display device according to the third exemplary embodiment is substantially the same as the display device according to the first exemplary embodiment in that the display device includes the display panel for displaying the image, the signal controller for controlling the signals for driving the display panel, and the graphic processing unit for transmitting the image data of each frame to the signal controller when displaying the motion picture.

The display panel includes a plurality of gate lines $G_{11}$-$Gn_3$ and a plurality of data lines $D_{11}$-$D_{m3}$, the plurality of gate lines $G_{11}$-$Gn_3$ extend in a horizontal direction, and the plurality of data lines $D_{11}$-$D_{m3}$ cross the plurality of gate lines $G_{11}$-$Gn_3$ and extend in a vertical direction.

The gate lines $G_{11}$-$Gn_3$ and the data lines $D_{11}$-$D_{m3}$ are connected with pixels $P_1$ to $P_9$ through respective switching elements.

The pixels $P_1$ to $P_9$ are defined by a first pixel P1, a second pixel P2, a third pixel P3 disposed in a first row, a fourth pixel P4, a fifth pixel P5, a sixth pixel $P_6$ disposed in a second row, a seventh pixel $P_7$, an eighth pixel $P_8$, and a ninth pixel $P_9$ disposed in a third row, where the nine pixels $P_1$ to $P_9$ form one pixel group. The nine pixels $P_1$ to $P_9$ forming one pixel group are disposed in a matrix form.

The gate lines $G_{11}$-$Gn_3$ are configured by first gate lines $G_{11}$ and $Gn_1$, second gate lines $G_{12}$ and $Gn_2$, and third gate lines $G_{13}$ and $Gn_3$ and the three gate lines $G_{11}$-$Gn_3$ form one gate line group.

The data lines $D_{11}$-$D_{m3}$ are configured by first data lines $D_{11}$ . . . , $D_{m1}$, second data lines $D_{12}$ . . . , $D_{m2}$, and third data lines $D_{13}$ . . . , $D_{m3}$, and the three data line sets among $D_{11}$-$D_{m3}$ each form one data line group.

Only three or four among the pixels $P_1$-$P_9$ among the nine pixels $P_1$-$P_9$ forming one pixel group are recharged in one frame. That is, in one embodiment, when the first pixel $P_1$, the second pixel $P_2$, and the fourth pixel $P_4$ are recharged in one frame, the third pixel $P_3$, the fifth pixel $P_5$, the sixth pixel $P_6$, the seventh pixel $P_7$, the eighth pixel $P_8$, and the ninth pixel $P_9$ are not recharged. In addition, any three pixels of the third pixel $P_3$, the fifth pixel $P_5$, the sixth pixel $P_6$, the seventh pixel $P_7$, the eighth pixel $P_8$, and the ninth pixel $P_9$ are recharged in the next frame. As described above, the first to ninth pixels $P_1$-$P_9$ are alternately recharged through three frames.

The first pixel $P_1$ is connected to its respective one of the first gate lines $G_{11}$ . . . , $Gn_1$ and with its respective one of the first data lines $D_{11}$ . . . , $D_{m1}$. Accordingly, when Von gate signals are applied to the first gate lines $G_{11}$ . . . , $Gn_1$ and data signals are applied to the first data lines $D_{11}$ . . . , $D_{m1}$, the first pixel $P_1$ is recharged.

The second pixel P2 is connected with its respective one of the first gate lines $G_{11}$ . . . , $Gn_1$ and with its respective one of the second data lines $D_{12}$ . . . , $D_{m2}$. Accordingly, when during the same frame the Von gate signals are applied to the first gate lines $G_{11}$ . . . , $Gn_1$ and the data signals are applied to the second data lines $D_{12}$ . . . , $D_{m2}$, the second pixel $P_2$ is recharged.

The third pixel $P_3$ is connected with its respective one of the first gate lines $G_{11}$ . . . , $Gn_1$ and with its respective one of the third data lines $D_{13}$ . . . , $D_{m3}$. Accordingly, when the gate signals are applied to the first gate lines $G_{11}$ and $Gn_1$ and the data signals are applied to the third data lines $D_{13}$ . . . , $D_{m3}$, the third pixel $P_3$ is recharged.

The fourth pixel $P_4$ is connected with its respective one of the second gate lines $G_{12}$ . . . , $Gn_2$ and the first data lines $D_{11}$ . . . , $D_{m1}$. Accordingly, when the gate signals are applied to the second gate lines $G_{12}$ . . . , $Gn_2$ and the data signals are applied to the first data lines $D_{11}$ and $D_{m1}$, the fourth pixel $P_4$ is recharged.

The fifth pixel $P_5$ is connected with the second gate lines $G_{12}$ . . . , $Gn_2$ and the second data lines $D_{12}$ . . . , $D_{m2}$. Accordingly, when the gate signals are applied to the second gate lines $G_{12}$ a . . . , $Gn_2$ and the data signals are applied to the second data lines $D_{12}$ . . . , $D_{m2}$, the fifth pixel $P_5$ is recharged.

The sixth pixel $P_6$ is connected with the second gate lines $G_{12}$ . . . , $Gn_2$ and the third data lines $D_{13}$ and $D_{m3}$. Accordingly, when the gate signals are applied to the second gate lines $G_{12}$ . . . , $Gn_2$ and the data signals are applied to the third data lines $D_{13}$ . . . , $D_{m3}$, the sixth pixel $P_6$ is recharged.

The seventh pixel $P_7$ is connected with the third gate lines $G_{13}$ . . . , $Gn_3$ and the first data lines $D_{11}$ . . . , $D_{m1}$. Accordingly, when the gate signals are applied to the third gate lines $G_{13}$ . . . , $Gn_3$ and the data signals are applied to the first data lines $D_{11}$ . . . , $D_{m1}$, the seventh pixel $P_7$ is recharged.

The eighth pixel $P_8$ is connected with the third gate lines $G_{13}$ . . . , $Gn_3$ and the second data lines $D_{12}$ . . . , $D_{m2}$. Accordingly, when the gate signals are applied to the third gate lines $G_{13}$ . . . , $Gn_3$ and the data signals are applied to the second data lines $D_{12}$ . . . , $D_{m2}$, the eighth pixel $P_8$ is recharged.

The ninth pixel $P_9$ is connected with the third gate lines $G_{13}$ . . . , $Gn_3$ and the third data lines $D_{13}$ . . . , $D_{m3}$. Accordingly, when the gate signals are applied to the third gate lines $G_{13} \ldots, Gn_3$ and the data signals are applied to the third data lines $D_{13} \ldots, D_{m3}$, the ninth pixel $P_9$ is recharged.

Hereinafter, a method of driving the display device according to the third exemplary embodiment will be described with reference to FIGS. 10A to 10C.

Figure 10A:
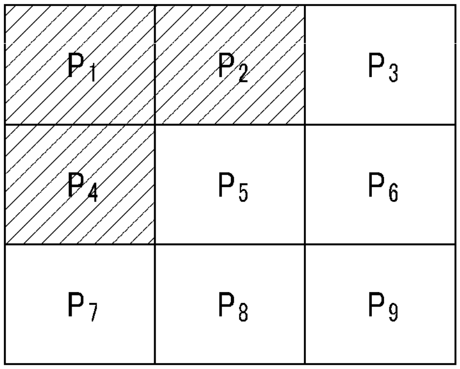
FIGS. 10A to 10C are diagrams illustrating pixels recharged for each frame in sequence when a still image is displayed by driving the display device according to the third exemplary embodiment of the present invention.
Figure 10B:
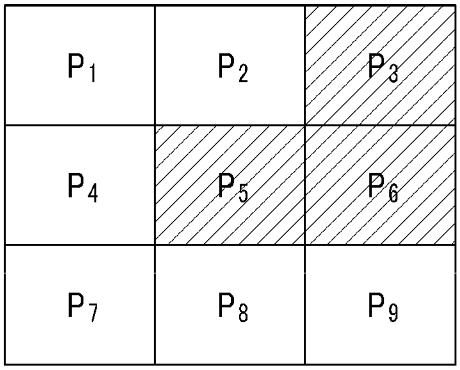
Figure 10C:
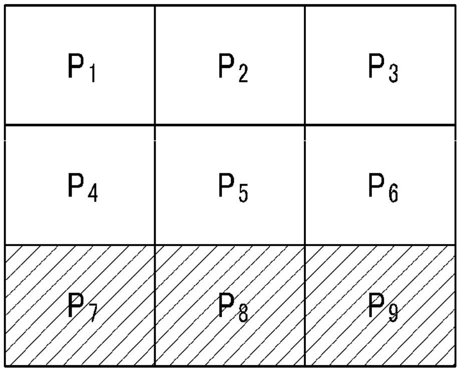

FIGS. 10A to 10C are diagrams illustrating pixels recharged for each frame in sequence when a still image is displayed by driving the display device according to the third exemplary embodiment of the present invention.

Since the method of displaying the motion picture is similar in many respects as the method of driving the display device according to the first exemplary embodiment 100, the description thereof is omitted and hereinafter, a method of displaying the still image will be described.

In detail, as shown in FIG. 10A, when the gate signals Von1 and Von2 are sequentially applied, with Von1 going to the first gate lines $G_{11} \ldots, Gn_1$ in the first frame displaying the still image, and the data signals are simultaneously applied to the first data lines $D_{11} \ldots, D_{m1}$ and to the second data lines $D_{12} \ldots, D_{m2}$ then P1 and P2 are refreshed. Further, when the gate signals Von2 are afterwards applied in the same frame to the second gate lines $G_{12} \ldots, Gn_2$, the data signals are applied to the first data lines $D_{11} \ldots, D_{m1}$ then P4 is refreshed. Accordingly, only the first pixel $P_1$, the second pixel $P_2$, and the fourth pixel $P_4$ are recharged in the first frame represented by FIG. 10A.

As shown in FIG. 10B, when the gate signals Von1 and Von2 are sequentially applied, with Von1 going to the first gate lines $G_{11} \ldots, Gn_1$ in the second frame, the data signals are applied to the third data lines $D_{13} \ldots, D_{m3}$ only P3 is refreshed. Further, when the Von2 gate signals are next applied in the same second frame to the second gate lines $G_{12} \ldots, Gn_2$, and the data signals are applied to the second data lines $D_{12} \ldots, D_{m2}$ and the third data lines $D_{13} \ldots, D_{m3}$ while only Von2 is applied then; accordingly, the third pixel $P_3$, the fifth pixel $P_5$, and the sixth pixel $P_6$ are recharged.

As shown in FIG. 10C, when the Von3 gate signals are applied to the third gate lines $G_{13} \ldots, Gn_3$ in the third frame, the data signals are applied to the first data lines $D_{11} \ldots, D_{m1}$, the second data lines $D_{12} \ldots, D_{m2}$, and the third data lines $D_{13} \ldots, D_{m3}$ then accordingly, only the seventh pixel $P_7$, the eighth pixel $P_8$, and the ninth pixel $P_9$ are recharged.

The display device according to the third exemplary embodiment 103 therefore alternately recharges the pixels $P_1$-$P_9$ included in one pixel group three by three on a three-frame cycle, thereby displaying the Still Picture.

In the exemplary embodiments, one pixel group is configured by four or nine pixels, the pixels configuring one pixel group are disposed in a matrix form or in a line, but the present invention is not limited thereto and may be variously modified. In this case, as the following Equation 1, the number of the pixels configuring one pixel group is configured by multiplying the number of the gate lines configuring one gate line group by the number of the data lines configuring one data line group.

$$n=x*y \qquad \text{[Equation 1]}$$

(n: the number of the pixels configuring one pixel group, a: the number of the gate lines configuring one gate line group, and b: the number of the data lines configuring one data line group)

Further, in the exemplary embodiments, the pixels configuring one pixel group are recharged one pixel or several pixels (but not all) in each respective one of an N-frame refresh cycle, but the order is not limited to thereto and may be variously modified.

Hereinafter, when display device according to the exemplary embodiments of the present disclosure of invention is driven, a degree in which the power consumption is reduced will be described.

Figure 11:
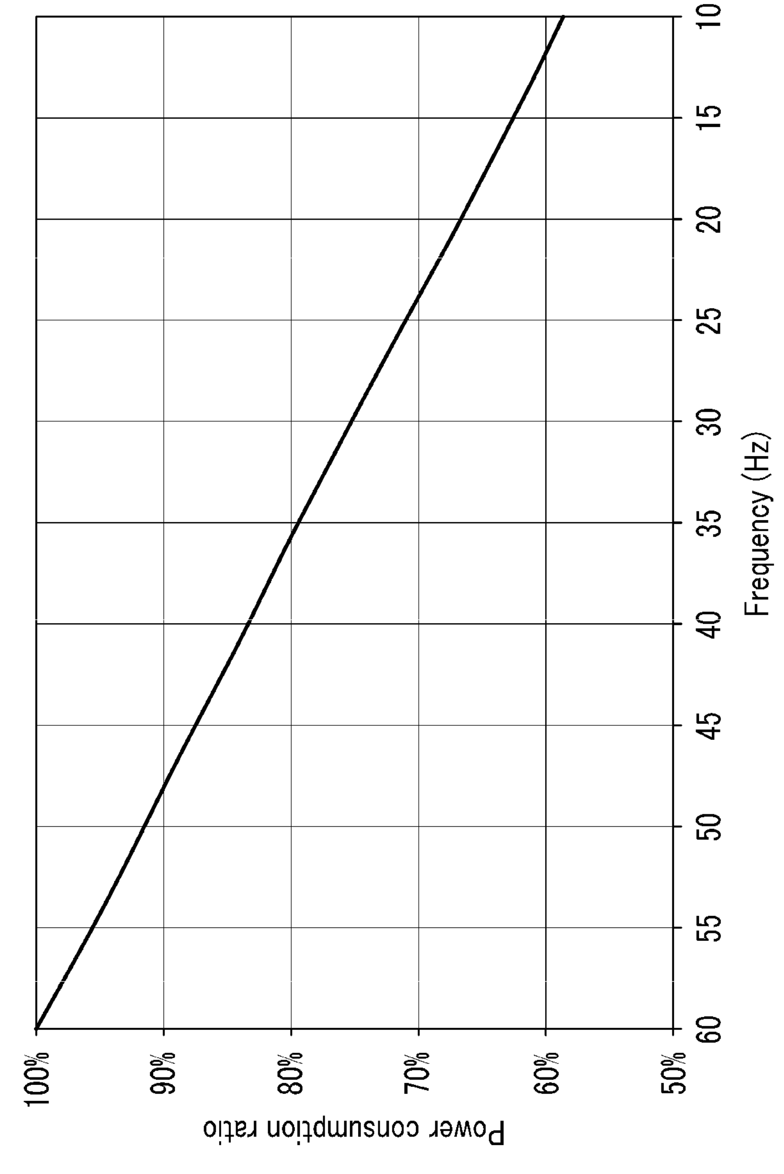
FIG. 11 is a graph illustrating a ratio of power consumption according to a frequency for driving a display device.

FIG. 11 is a graph illustrating a ratio of relative power consumption according to a frequency for driving a display device.

When the still image is displayed in the display device according to the first exemplary embodiment 100 of the present invention, only half of the gate lines and half of the data lines are driven in one frame. Accordingly, the power consumption is consumed like the case where a frequency for driving the display device is reduced in half.

Referring to FIG. 11, if a ratio of a relative power consumption is taken to be 100% when the frequency is for example 60 Hz, and if the frequency is reduced to 30 Hz, the ratio of the power consumption is reduced to about 75% of the full frequency mode.

That is, in the display device according to the first exemplary embodiment 100, the gate lines are divided into the first gate lines and the second gate lines and then, one of the two gate lines is driven in one frame, and the data lines are divided into the first data lines and the second data lines and then, one of the two data lines is driven in one frame, such that the power consumption may be reduced by about 25%.

As described above, in the present disclosure of invention, when the still image is to be displayed, only some of the gate lines and/or only some of the data lines are driven in one frame to thereby recharge only some of the pixels, such that the power consumption for driving the pixels can be reduced. Further, other pixels are recharged in the next frame. Additionally, when Still Picture mode is in effect, the GPU does not need to transmit new data DAT and power consumption is reduced on that account as well. As described above, the plurality of pixels configuring one pixel group are alternately recharged through the plurality of frames, such that an entire Still Picture can be displayed.

While this disclosure of invention has been provided in connection with what is presently considered to be practical exemplary embodiments, it is to be understood that the teachings are not limited to the disclosed embodiments, but, on the contrary, it is intended to cover various modifications and equivalent arrangements included within the spirit and scope of the teachings.

What is claimed is:

1. A display device, comprising:

a display panel structured for displaying a still image and for displaying a motion picture;

a graphic processing unit (GPU) configured to provide first data signals representing changing image data of the motion picture when a motion picture mode is in effect; and a frame memory, operatively coupled to the GPU and configured for storing image data of the still image, wherein the display panel is subdivided into a plurality of Still Picture Refresh Groups (SPRGoP's), with each SPRGoP consisting of n pixels, wherein the display device is configured to be operated such that all n pixels of a Still Picture Refresh Group (SPRGoP) are charged in each of sequential frames when the motion picture mode is in effect, and wherein the display device is configured to be operated such that only a subset of the n pixels of the SPRGoP charged in each of sequential frames when the still picture mode is in effect.

2. The display device of claim 1, wherein:

the n pixels are disposed in a matrix form.

3. The display device of claim 2, wherein:
when the still image mode is in effect:
Von gate signals are alternately applied to different ones of the x gate lines of the pixels of a given SPRGoP in respective frames of an N-frame refresh cycle, and
driving data voltages are alternately applied to different ones of the y data lines of the pixels of a given SPRGoP in the respective frames of the N-frame refresh cycle while others of the y data lines float.

4. The display device of claim 3, wherein:
the pixel group includes four pixels,
the gate line group includes two gate lines, and
the data line group includes two data lines.

5. The display device of claim 4, wherein:
the gate signals may be alternately applied to the two gate lines every frame and
the data signals may be alternately applied to the two data lines every two-frame.

6. The display device of claim 4, wherein:
the gate signals may be alternately applied to the two gate lines every two-frame and
the data signals may be alternately applied to the two data lines every two-frame.

7. The display device of claim 4, wherein:
the gate signals may be alternately applied to the two gate lines every two-frame and
the data signals may be alternately applied to the two data lines every frame.

8. The display device of claim 1, wherein:
the display panel includes
a gate line; and
a data line group including y data lines crossing the gate line,
wherein n=y.

9. The display device of claim 8, wherein:
the n pixels are disposed in the gate line direction in a line and
the data signals may be alternately applied to the y data lines every frame.

10. A method of driving a display device for causing the display device to display each of a motion picture and a still image,
wherein a display area of the display device is subdivided into a plurality of Still Picture Refresh Groups (SPRGoP's), with each SPRGoP consisting of n pixels,
the method comprising:
(a) when displaying the motion picture, charging all of n pixels of each refresh group during every frame of a sequence of frames forming the motion picture; and
(b) when displaying the still image, charging less than all n pixels of each refresh group during every frame of a sequence of frames defining an N-frame refresh cycle,
wherein in the (a) step,
a graphic processing unit provides first data signals representing image data of the motion picture, and
in the (b) step,
a frame memory stores image data of the still image which stored image data is used for refreshing each refresh group over the course of the N frames of a corresponding N-frame refresh cycle.

11. The method of claim 10, wherein:
the refresh group consists of
a gate line group consisting of x gate lines; and
a data line group consisting of y data lines,
wherein n=x*y.

12. The method of claim 11, wherein:
the n pixels are disposed in a matrix form.

13. The method of claim 12, wherein:
in the (b) step,
the gate signals may be alternately applied to the x gate lines every at least one or more frame and
the data signals may be alternately applied to the y data lines every at least one or more frame.

14. The method of claim 13, wherein:
the (b) step includes
(b-11) applying a gate signal to a first gate line and applying a data signal to a first data line in the first frame;
(b-12) applying a gate signal to a second gate line and applying a data signal to a first data line in the second frame;
(b-13) applying a gate signal to a first gate line and applying a data signal to a second data line in the third frame; and
(b-14) applying a gate signal to a second gate line and applying a data signal to a second data line in the fourth frame.

15. The method of claim 13, wherein:
the (b) step includes
(b-21) applying a gate signal to a first gate line and applying a data signal to a first data line in the first frame;
(b-22) applying a gate signal to a first gate line and applying a data signal to a second data line in the second frame;
(b-23) applying a gate signal to a second gate line and applying a data signal to a second data line in the third frame; and
(b-24) applying a gate signal to a second gate line and applying a data signal to a first data line in the fourth frame.

16. The method of claim 13, wherein:
the (b) step includes
(b-31) applying a gate signal to a first gate line and applying a data signal to a first data line in the first frame;
(b-32) applying a gate signal to a first gate line and applying a data signal to a second data line in the second frame;
(b-33) applying a gate signal to a second gate line and applying a data signal to a first data line in the third frame; and
(b-34) applying a gate signal to a second gate line and applying a data signal to a second data line in the fourth frame.

17. The method of claim 13, wherein:
the (b) step includes
(b-41) applying a gate signal to a first gate line and applying a data signal to a second data line in the first frame;
(b-42) applying a gate signal to a first gate line and applying a data signal to a first data line in the second frame;
(b-43) applying a gate signal to a second gate line and applying a data signal to a second data line in the third frame; and
(b-44) applying a gate signal to a second gate line and applying a data signal to a first data line in the fourth frame.

18. The method of claim 10, wherein:
the refresh group consists of
a gate line; and
a data line group including y data lines,
wherein n=y.

19. The method of claim 18, wherein:
the n pixels are disposed in the gate line direction in a line and
in the (b) step,
the data signals may be alternately applied to the y data lines every frame.

* * * * *